Feb. 6, 1945.   R. D. BOURNE   2,368,702
STREAMLINED HINGE LINE FOR AIRCRAFT
Filed April 8, 1943   2 Sheets-Sheet 1
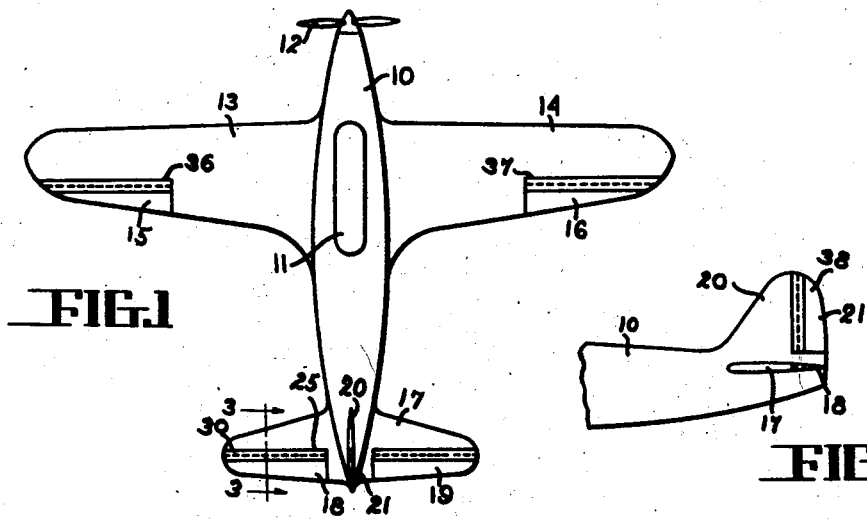//
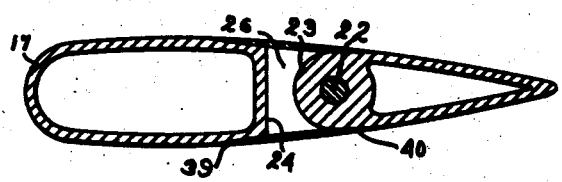
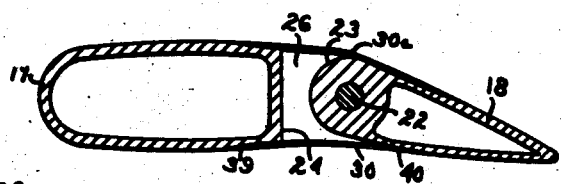
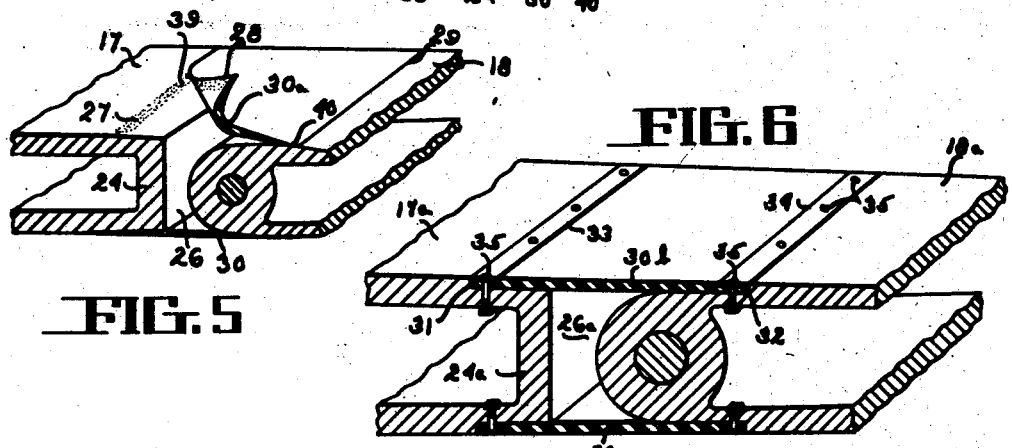
INVENTOR
RAYMOND D. BOURNE
BY
*Toulmin & Toulmin*
ATTORNEY Feb. 6, 1945.　　　R. D. BOURNE　　　2,368,702
STREAMLINED HINGE LINE FOR AIRCRAFT
Filed April 8, 1943　　　2 Sheets-Sheet 2

INVENTOR
RAYMOND D. BOURNE
BY
Toulmin & Toulmin
ATTORNEY

Patented Feb. 6, 1945

2,368,702

UNITED STATES PATENT OFFICE 2,368,702

STREAMLINED HINGE LINE FOR AIRCRAFT

Raymond D. Bourne, Middletown, Ohio

Application April 8, 1943, Serial No. 482,239

1 Claim. (Cl. 244—130)

This invention relates to aircraft, and particularly to the construction of the control surfaces of the aircraft.

An object of the invention is to provide means to streamline the hinge line between a control surface and a stationary surface.

Another object of the invention is to provide means for eliminating the drag produced upon an aircraft that results from the angular position of a control surface relative to a stationary surface when the control surface is operated.

It is another object of the invention to provide means for preventing air that is passing over the wing or tail surface of an aircraft from entering the space between the main surface and a control surface of a wing or tail structure.

It is another object of the invention to provide an aircraft with a flexible membrane disposed across the hinge line of a control surface to streamline the hinge line of a control surface and thereby avoid turbulence of the air at the hinge line of the control surface.

Further objects and advantages will become apparent from the drawings and the following description.

In the drawings:

Fig. 1 is a plan elevational view of an aircraft upon which this invention has been applied.

Fig. 2 is a side elevational view of the tail portion of an aircraft showing the invention applied to the hinge line of the control surfaces.

Fig. 3 is a transverse cross-sectional view taken along line 3—3 of Fig. 1, showing a flexible membrane extending across the hinge line between the horizontal tail plane and the elevator of the tail assembly.

Fig. 4 is a transverse cross-sectional view similar to Fig. 3, showing an elevator disposed angularly with respect to the horizontal tail plane to illustrate the streamline effect obtained by the application of this invention.

Fig. 5 is a partial transverse cross-sectional view similar to Figs. 3 and 4, in perspective, showing one of the methods for attaching a flexible membrane to the skin of the horizontal tail plane and elevator of a tail assembly.

Fig. 6 is a transverse cross-sectional view, in perspective, showing another method of attaching a flexible membrane between the tail plane and the elevator.

Figure 7:
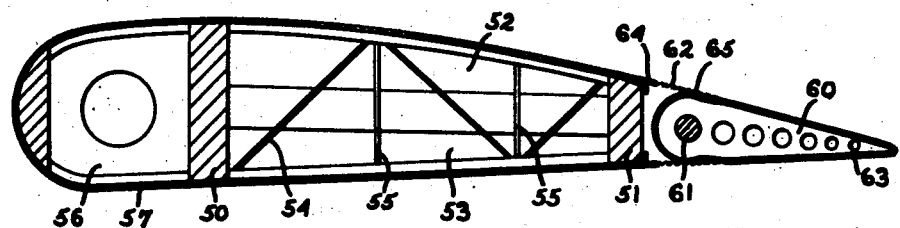
Fig. 7 is a transverse cross-sectional view of a wing section in more detailed constructional arrangement showing the invention applied thereto.

This invention relates to aircraft, and particularly to a means for closing the space between a main wing or tail surface and a control surface at the hinge line thereof. When the ailerons, elevators, and rudder are assembled upon the wings, the horizontal tail planes and the vertical fin respectively of an aircraft, there is a space provided between the stationary or main surface and the control surface. The hinged end of the control surfaces are rounded so that they can be moved to relatively step angles relative to the main wing or tail surface to produce rapid maneuvering of the aircraft when the control surfaces are operated. There is of necessity a certain amount of space provided between the main surface and the edge of the control surface to permit this angular movement of the control surface relative to the main surface.

As long as the aircraft is in normal horizontal flight the air flow across the wing or tail surface and control surfaces will be relatively smooth, the streamline flow of air bridging the gap between the main surface and control surface in the hinge line. However, when a control surface is operated and it is positioned angularly to the main surface, the normal streamline flow of air across the main surface and the control surface is broken. Under such conditions the angularity produced between the main surface and the control surface creates a turbulence in the air at the hinge line of the control surface. This turbulence or burbling of the air reduces the efficiency of the control surface, and also produces drag upon the aircraft.

To overcome these difficulties, according to this invention, a flexible membrane is disposed across the gap produced at the hinge line of a control surface to thereby close the space at the hinge line so that the air flow across the hinge line will be maintained in its streamline flow even when the control surface is disposed angularly with respect to the main surface.

This invention can be applied to any aircraft and is applied to an aircraft disclosed in this invention consisting of a fuselage 10 having a cockpit 11. A suitable power source is carried by the fuselage 10 for driving the air screw 12. The wings 13 and 14 are secured to the fuselage 10 and are provided with the usual ailerons 15 and 16, respectively.

The tail assembly for the fuselage 10 consists of the horizontal tail plane 17 that is provided with the elevators 18 and 19. The vertical fin 20 of the tail assembly supports the rudder 21.

Each of the control surfaces 15, 16, 18, 19 and 21 are supported upon a suitable hinge connection so that they can be disposed angularly with respect to the main surfaces adjacent the respective control surfaces. As illustrated in Fig. 3, which is a cross-section through the horizontal tail plane and elevators 18 and 19, respectively, the elevator 18 is carried upon a hinge pin 22 that extends into engagement with the tail plane 17 so that the elevator 18 can be rotated upon the hinge pin 22 for positioning the same angularly with respect to the tail plane 17, as shown in Fig. 4. The forward end 23 of the elevator 18 is rounded so that the elevator can rotate upon the hinge pin 22 without causing interference with the rear wall 24 of the cut-out portion 25 provided in the tail plane 17 to receive the elevator 18.

There is, therefore, a space 26 provided between the forward end 23 of the elevator 18 and the wall 24 of the tail plane 17, which space 26 produces an irregularity in the surface of the tail assembly. Under normal horizontal flight conditions the streamline flow of air across the skin of the tail plane 17 will permit the air to bridge the space 26 and reach the skin of the elevator 18 without producing any substantial turbulence at the hinge line of the elevator 18.

However, when the elevator 18 is operated to position it angularly with respect to the tail plane 17, as shown in Fig. 4, the normal streamline flow of air between the tail plane 17 and the elevator 18 is disturbed and the space 26 produces a decided irregularity in the streamline flow of the air between the two surfaces. This is particularly true on the underside of the tail plane and elevator when the elevator is in the position shown in Fig. 4. The turbulence, or burbling of air produced at this hinge line at the space 26 reduces the efficiency of the elevator 18 and also produces drag upon the aircraft.

To eliminate this turbulence of air at the hinge line of the elevator 18 a flexible membrane 30 is positioned across the space 26 provided at the hinge line between the elevator 18 and the tail plane 17. A similar flexible membrane 30a is disposed across the hinge line on the opposite side of the tail plane and elevator to thereby form an enclosed space 26, which encloses the forward end 23 of the elevator 18.

This flexible membrane may be of any suitable flexible material, such as rubber, or a rubber-like material, such as the synthetic rubber products. When the elevator 18 is now positioned as shown in Fig. 4, the membrane 30 will bridge the space 26 and thereby provide a smooth streamline surface over which the air can flow from the tail plane 17 to the elevator 18.

To establish a streamline surface between the tail plane 17 and the elevator 18, the flexible membranes 30 and 30a may be secured to the skin of the tail plane and elevator, as shown in Fig. 5, wherein the membrane 30a has been lifted from the skin of the tail plane 17 to illustrate the line of adhesive that secures the edge 28 to the skin of the tail plane 17. The edge 28 of the membrane 30a is tapered to a feather edge so that when it is secured to the skin of the tail plane 17 there will be substantially no surface elevation of the membrane 30a from the skin of the tail plane 17. Suitable adhesives are provided for securing rubber and synthetic rubber products to surfaces of various types, and therefore the adhesive used will depend upon the material of the surface of the skin of the tail plane 17. Also, the edge of the membrane 30a could be vulcanized to the skin of the tail plane 17 by suitable vulcanizing processes now known to those skilled in the art for vulcanizing rubber and rubber-like products to metal surfaces. The trailing edge 29 of the membrane 30a is similarly attached to the elevator 18, also, the membrane 30 is attached to the tail plane and elevator in a like manner.

In Fig. 6 there is shown a slightly modified arrangement for attaching the flexible membranes to the tail plane 17a and the elevator 18a. In this arrangement a recess 31 is provided along the rear edge of the tail plane 17 and a similar recess 32 is provided along the forward edge of the elevator 18. A sheet of flexible material 30b is positioned across the space 26a at the hinge line of the elevator 18a and has the ends thereof disposed in the recesses 31 and 32. Metal strips 33 and 34 are placed upon the edges of the flexible sheet, or membrane 30b. Suitable bolts or rivets 35 extend through the metal strips 33 and 34, the edges of the membrane 30b and the tail plane and elevator to secure the membrane 30b thereto. A similar flexible membrane 30c is disposed upon the opposite side of the hinge line of the elevator 18a.

While the description herein has been directed to the use of flexible membranes across the hinge line between the horizontal tail plane and the elevator of a tail assembly, yet it is to be understood that such flexible membranes can be placed across the hinge line of any control surface of the aircraft including the ailerons 15, 16, and the rudder 21. The flexible membranes across the hinge line of the ailerons 15 and 16 are indicated by the reference numerals 36 and 37, respectively, while the flexible membrane across the hinge line of the rudder 21 is indicated by the numeral 38. Each of the membranes heretofore referred to are secured to the surfaces on opposite sides of the hinge lines so that a smooth streamline contour results at the hinge line when the control surface is moved relative to the main surface. To produce a smooth streamline surface the membranes, as indicated by the membrane 30, see Fig. 4, are attached to the surfaces adjacent the hinge line at points that are relatively remote from the hinge line, whereby the flexible membrane may produce a smooth surface contour between the surfaces on opposite sides of the hinge line. It will be noted that the points of attachment of the membrane 30 are relatively remote, being indicated by the numerals 39 and 40. It is to be understood, of course, that the flexible membranes are to have sufficient stiffness to prevent them from vibrating, and yet will not offer any substantial resistance to the operation of the control surfaces.

In Fig. 7 there is shown a more detailed construction of a wing structure that incorporates the feature of the invention. In this structure there is provided a front spar 50 and a rear spar 51 that extend longitudinally along the wing structure and provide the main support for the wing. The webs 52 and 53 extend between the front spar 50 and rear spar 51 for providing transverse rigidity to the wing structure. To further increase the rigidity of the wing structure there is provided the diagonals 54 and the verticals 55 which internally brace the wing structure. A nose web 56 extends forward of the front spar 50 and a skin 57 is provided around the entire wing structure.

As shown in Fig. 7 the aileron 60 is pivoted upon the pin or rod 61 extending between suitable bearing members in the wing structure.

Figure 9:
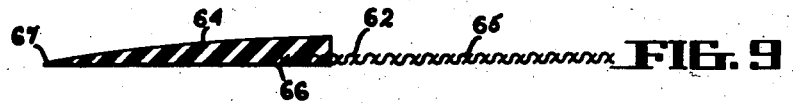
Fig. 9 is a cross-sectional view of a modified arrangement of the closure member for a hinge that reduces the amount of flexible material used in the cover member.

The membrane 62 that extends between the skin 57 of the wing and the skin 63 of the aileron may consist of a flexible portion 64 and a fabric portion 65 that is more clearly shown in Fig. 9. The rubber, or rubber like, section 64, provides flexibility or stretchability, to the membrane 62 so that when the aileron 60 is moved relative to the wing structure that the membrane can stretch as required by the movement of the aileron.

Figure 10:
Figs. 10, 11 and 12 are further modified arrangements of the cover member for conserving the flexible material.

As shown in Fig. 9 the fabric portion 65 is imbedded in the rubber portion 64 adjacent one surface thereof so that the surface of the fabric portion is substantially parallel to the surface of the flexible portion 64. This surface 66 is the one that is exposed to the air moving over the surface of the wing so that there will be no protrusions or irregularities in the wing surface that will disturb the air flow. The flexible portion 64 is provided with a feather edge 67 so that when the flexible portion 64 is secured to the surface of the wing there will be no protrusion of the edge of the flexible portion that would disturb the air flow over the wing surface. If desired the flexible portion may take the form disclosed in Fig. 10 wherein the portion 64a is feathered on both edges.

Figure 11:
Figure 12:
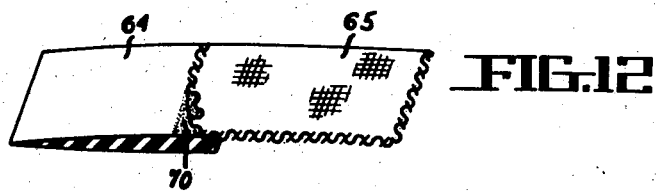

Also, in place of securing the flexible portion 64a to the wing surface, the flexible portion can be positioned between two fabric portions 68 and 69 as illustrated in Fig. 11. In this manner the flexible portion 64b is provided as the central area of the membrane 62. It may be that in some instances it will be easier to secure or cement fabric portions to the surface of the wing than the flexible portion, in which instance this latter form would be preferable. Fig. 12 illustrates a manner in which the fabric portion 65 may be cemented to the rubber portion 64 by means of adhesive 70 in place of vulcanizing the same within the body of the rubber strip.

Figure 8:
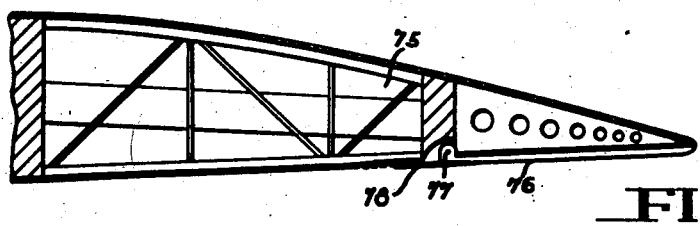
Fig. 8 is a transverse cross-sectional view of a wing section showing the invention as applied to a flat hinge.

In Fig. 8 there is shown a wing structure 75 similar to that disclosed in Fig. 7 except that a flap 76 is hinged to the wing structure by the hinge pin 77. During normal flight operations the flap 76 lays against the under surface of the wing structure and forms a part of the streamline surface of the wing. However, the hinge connection for the flap 76 offers an obstruction to the streamline air flow across the wing surface because of the openings required for the hinge of the flap, these openings producing a disturbance in the air flow. To overcome this disturbance in the air flow a flexible membrane 78 is provided across the hinge joint from the under surface of the wing 75 to the under surface of the flap 76. The flexible member or membrane 78 can be any of the forms heretofore disclosed.

While the apparatus disclosed and described herein constitutes a preferred form of the invention, yet it is to be understood that the particular apparatus can be modified without departing from the spirit of the invention and that all such modifications as fall within the scope of the appended claim are intended to be included herein.

Having thus fully described my invention what I claim as new and desire to secure by Letters Patent is:

An aircraft that includes in combination, a main supporting surface, a control surface movable angularly to the supporting surface upon a hinge line, recess means in said main surface and said control surface extending longitudinally along the hinge line therebetween that is feathered along the side thereof most remote from said hinge line, and a flexible membrane extending across said hinge line in engagement with said surface to close the space produced at said hinge line and have opposite longitudinal edges thereof feathered for positioning in said recesses in said surfaces with the feathered edges of said recesses for producing a streamlined contour between said surfaces and across said hinge line, said feathered edges of said flexible membrane receiving a fabric strip extending longitudinally along the same and co-extensive therewith for securing said flexible membrane to said surfaces.

RAYMOND D. BOURNE.